(No Model.)
D. D. BUICK.
DISCHARGE VALVE FOR WATER CLOSET TANKS.
No. 502,611. Patented Aug. 1, 1893.
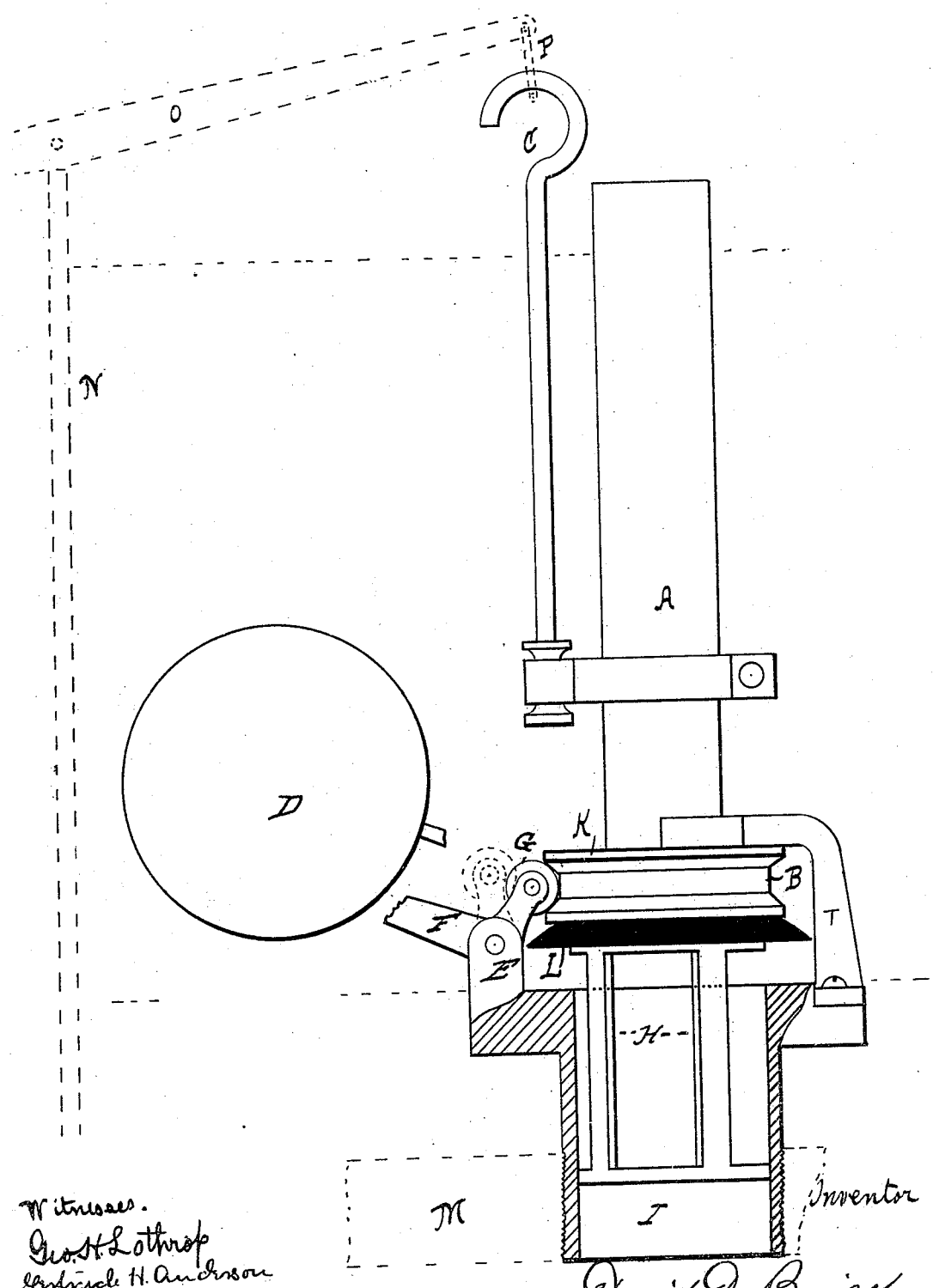
Witnesses.
Geo. H. Lothrop
Gertrude H. Anderson
Inventor
David D. Buick

United States Patent Office.

DAVID D. BUICK, OF DETROIT, MICHIGAN.

DISCHARGE-VALVE FOR WATER-CLOSET TANKS.

SPECIFICATION forming part of Letters Patent No. 502,611, dated August 1, 1893.

Application filed September 8, 1892. Serial No. 445,327. (No model.)

*To all whom it may concern:*

Be it known that I, DAVID D. BUICK, of Detroit, in the county of Wayne and State of Michigan, have invented a new and useful Improvement in Discharge-Valves for Water-Closet Tanks, of which the following is a specification.

My invention consists in an improvement in discharge valves for water-closet tanks, hereinafter fully described and claimed.

The drawing is an elevation of a valve, partly in section, with a portion of the tank shown in dotted lines.

I represents the valve seat, which is adapted to pass through the bottom M of an overhead tank.

A represents a valve stem, preferably in the form of a hollow pipe which carries on its lower end a washer L, adapted to seat on the top of valve seat I, and which is guided in its upward and downward movements by fair-leader H working within seat I, and by a curved bracket T secured on and rising from said valve seat. Near the lower end of pipe A it is shaped somewhat like a short spool, forming a groove B with a projecting shoulder K above it. The hollow pipe A serves as an overflow should the water rise too high in the tank.

C represents a hook connected to pipe A, and also connected with one end of the pull-lever O by a chain or link P, by which the pipe A carrying valve L may be raised.

F represents a bell-crank lever pivoted at E in a bracket formed on valve seat I, on the long arm of which lever is carried a float D, and on the short arm a pivoted roller G.

The upper dotted line proceeding from the dotted side N of the tank represents the normal water level, while the lower dotted line represents the lowest water level.

The valve is represented in the drawing as open and water flowing out through valve seat I. As the float D is entirely submerged when the tank is full to the normal water level, it forces the short arm of bell-crank lever F toward the valve, and forces the roller G into the groove B as shown in the drawing, in which position the shoulder K bears against said roller G and the valve is held in an elevated position to permit the escape of water from the tank. As the water falls in the tank, the float D will go down with it until it depresses the long arm of bell-crank lever F sufficiently to withdraw the short arm and roller G into the position shown in dotted lines in the figure, in which position said roller no longer lies under shoulder K, and the valve is permitted to seat. As the water rises in the tank, the float D will again rise, but in this position the roller G will strike against the shoulder K without entering the groove B, and will follow down into groove B when the valve is again raised.

What I claim as my invention, and desire to secure by Letters Patent, is—

1. In a flushing-tank the combination with a valve-seat, a valve, and means for raising said valve, of a bell-crank lever pivoted within the tank and a float on one arm of said lever normally urging the other arm of said lever toward the valve, and a roll upon the end of the latter arm adapted to engage and sustain the valve when lifted, and to rest upon said valve and hold it to its seat, when the float rises by the filling of the tank, substantially as shown and described.

2. In combination with the valve-seat I, the valve A L, having thereon the groove B and the shoulder K, and the bell-crank lever F carrying on one arm the float D, and upon the other arm a roll G, substantially as shown and described.

DAVID D. BUICK.

Witnesses:
GERTRUDE H. ANDERSON,
GEO. H. LOTHROP.